(12) United States Patent
Stevenson et al.

(10) Patent No.: US 8,537,649 B2
(45) Date of Patent: Sep. 17, 2013

(54) OPTICAL RETRIEVAL SYSTEM, DATA STORAGE SYSTEM, DATA STORAGE MEDIUM AND METHOD OF OPTICAL RETRIEVAL AND DATA STORAGE

(75) Inventors: Richard Mark Stevenson, Cambridge (GB); Zhiliang Yuan, Cambridge (GB); Robert Young, Cambridge (GB); Andrew James Shields, Cambridge (GB)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 12/666,883

(22) PCT Filed: Jun. 27, 2008

(86) PCT No.: PCT/GB2008/002236
§ 371 (c)(1),
(2), (4) Date: Jun. 1, 2010

(87) PCT Pub. No.: WO2009/001105
PCT Pub. Date: Dec. 31, 2008

(65) Prior Publication Data
US 2010/0232279 A1 Sep. 16, 2010

(30) Foreign Application Priority Data
Jun. 28, 2007 (GB) .................................. 0712596.6

(51) Int. Cl.
*G11B 7/00* (2006.01)

(52) U.S. Cl.
USPC ........................................................ 369/103

(58) Field of Classification Search
USPC ................. 369/103, 47.27, 47.1, 44.37, 126, 369/143; 430/280.01; 359/497, 433, 73.1, 359/326, 332; 250/493.1, 458.1; 398/183
See application file for complete search history.

(56) References Cited

U.S. PATENT DOCUMENTS

| | | | |
|---|---|---|---|
| 3,922,061 A | 11/1975 | Glass et al. | |
| 5,796,477 A | 8/1998 | Teich et al. | |
| 5,866,911 A * | 2/1999 | Baer | 250/458.1 |
| 6,646,727 B2 * | 11/2003 | Saleh et al. | 356/73.1 |
| 6,882,431 B2 * | 4/2005 | Teich et al. | 356/497 |
| 7,001,708 B1 * | 2/2006 | Belfield | 430/280.1 |
| 7,027,376 B2 * | 4/2006 | Toussaere et al. | 369/103 |

(Continued)

FOREIGN PATENT DOCUMENTS

| | | |
|---|---|---|
| EP | 1 164 401 | 12/2001 |
| JP | 2004-79121 | 3/2004 |

(Continued)

OTHER PUBLICATIONS

Bouwmeester, Dirk, "High N00N for photons", Nature, vol. 429, pp. 139 and 141, May 13, 2004.

(Continued)

*Primary Examiner* — Nabil Hindi
(74) *Attorney, Agent, or Firm* — Oblon, Spivak, McClelland, Maier & Neustadt, L.L.P.

(57) ABSTRACT

An optical data retrieval system configured to retrieve data from a data storage medium, including: a source of n path-entangled photons, where n is an integer of at least 2; a detector system configured to determine if n photons have been received; and a mechanism to direct photons from the source to the data storage medium and to the detector system.

20 Claims, 16 Drawing Sheets

(56) References Cited

U.S. PATENT DOCUMENTS

| | | | |
|---|---|---|---|
| 7,608,384 B1* | 10/2009 | Belfield | 430/270.15 |
| 7,609,382 B2* | 10/2009 | Kastella et al. | 356/433 |
| 2001/0001607 A1 | 5/2001 | Miyauchi et al. | |
| 2002/0018290 A1 | 2/2002 | Birk et al. | |
| 2005/0213107 A1 | 9/2005 | Ichimura et al. | |
| 2006/0077871 A1 | 4/2006 | Inoue et al. | |
| 2007/0140087 A1 | 6/2007 | Fukuzawa et al. | |

FOREIGN PATENT DOCUMENTS

| | | |
|---|---|---|
| WO | 00 75730 | 12/2000 |
| WO | 02 095353 | 11/2002 |
| WO | 2007 060674 | 5/2007 |

OTHER PUBLICATIONS

Walther, Philip et al., "De Broglie wavelength of a non-local four-photon state", Nature, vol. 429, pp. 158-161, May 13, 2004.

Mitchell, M.W. et al., "Super-resolving phase measurements with a multiphoton entangled state", Nature, vol. 429, pp. 161-164, May 13, 2004.

Muthukrishnan, Ashok et al., "Quantum microscopy using photon correlations", Journal of Optics B: Quantum and Semiclassical Optics, vol. 6, pp. S575-S582, May 28, 2004.

\* cited by examiner

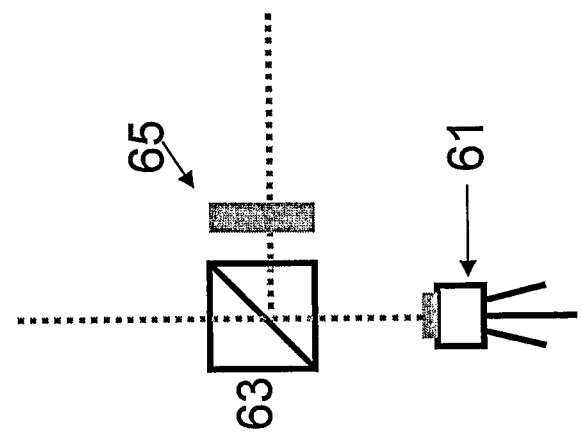
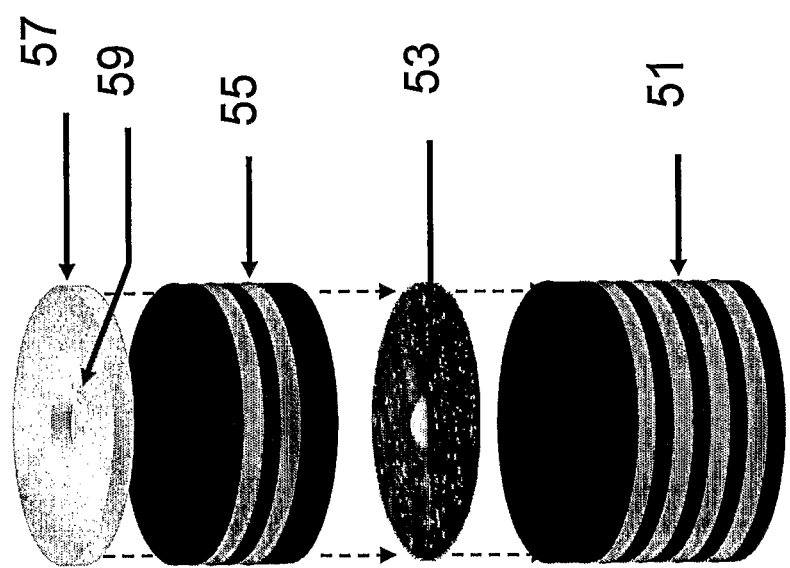
Figure 3

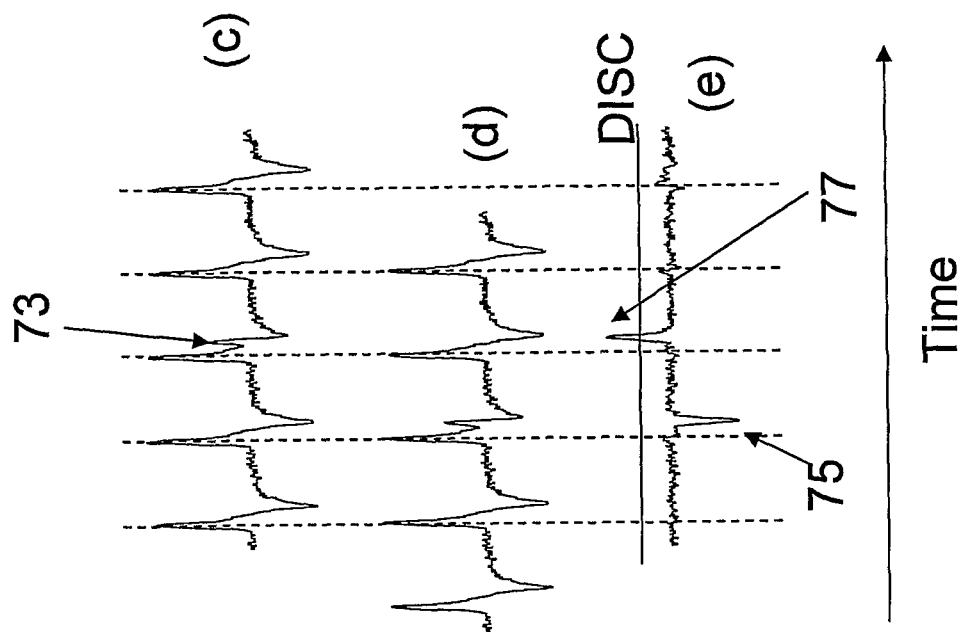
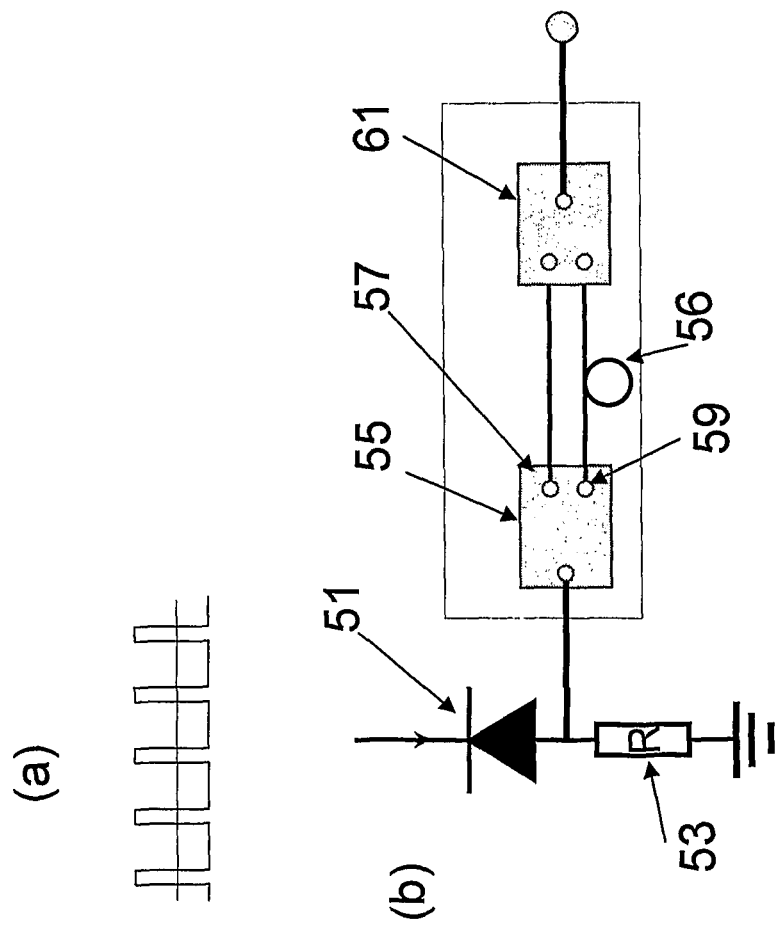
Figure 12

OPTICAL RETRIEVAL SYSTEM, DATA STORAGE SYSTEM, DATA STORAGE MEDIUM AND METHOD OF OPTICAL RETRIEVAL AND DATA STORAGE

The present invention relates to an optical data retrieval system, data storage system, data storage medium and method of optical data retrieval and storage. More specifically, the present invention relates to an optical data retrieval system, data storage system, data storage medium and method of optical data retrieval and storage which utilises quantum entanglement.

In general, the smallest feature size R of an image is conventionally limited by the wavelength of the light source. For a focussed light spot, this is known as the Rayleigh criteria, which for light with wavelength $\lambda$ in air, focused by a lens with numerical aperture NA is given by $R=1.22\lambda/2(NA)$. If a priori information about the image is known, it is possible to resolve features smaller than the wavelength. Using entangled light the smallest feature size can be reduced by a factor N, where N is the number of photons in the entangled multi-photon states. Thus for entangled photon pairs emitted at 400 nm, the smallest feature size with a NA=0.65 lens is 188 nm. This principle of enhancing resolution is used in the emerging field of quantum imaging.

In a first aspect, the present invention provides an optical data retrieval system configured to retrieve data from a data storage medium, the system comprising:
a source of n path-entangled photons, where n is an integer of at least 2;
a detector system configured to determine if n photons have been received; and
means to direct photons from said source to said data storage medium and to said detector system.

In a preferred embodiment, the data storage medium is of the DVD or CD type where the data is encoded in the relief of the data storage medium and the radiation is reflected off the data storage medium.

To achieve a practical system which can be easily integrated with current technology, the source preferably comprises a quantum dot. Such a source can be fabricated from semiconductors using existing technology. These type of sources output polarisation entangled photons. In order to use entanglement to obtain higher resolution, it is necessary to use path entangled photons.

Such path entangled photons may be produced by a source which comprises a waveguide structure configured to allow emission of photons with a first polarisation along a first path and photons with a second polarisation along a second path. Alternatively, the source may further comprise a polarising beam splitter configured to convert polarisation entangled photons to path entangled photons.

The detection system needs to be able to determine between detecting the n photons from the entangled source and just detecting single photons. To achieve this, the detection system may comprise a plurality of detectors and means to divide the entangled photons between said detectors.

Another possibility is for the detector to be a so-called photon number discriminating detector which has an output which indicates the number of photons detected. For example, the amplitude of the output may be proportional to the number of photons, or the number of peaks detected as the detector resets itself may indicate the number of photons.

It is preferable for the detector to have a high detection frequency. Such a detection system may be provided by an avalanche photodiode and correction circuit, said circuit comprising a signal divider to divide the output signal of the avalanche photodiode into a first part and a second part, where the first part is substantially identical to the second part, delay means for delaying the second part with respect to the first part and a combiner for combining the first and delayed second parts of the signal such that delayed second part is used to cancel periodic variations in the first part of the output signal.

The bit rate for read out frequency may also be increased by using multiple sources and detectors.

The photons are path entangled for m paths and m is an integer of at least 2. There is no requirement for the number or entangled photons and the number of entangled paths to be the same.

The resolution enhancement only happens in directions where the paths differ. Thus, the photons are preferably path entangled in a plane parallel to the direction in which the data is read.

If there are three or more paths, then it is possible to achieve enhanced resolution in more than one spatial direction.

In one embodiment, each of said m paths are reflected off said recording medium. Here, the intensity of the reflected radiation determined from the count rate of the detectors may be used to decode the data on the recording medium.

Another embodiment uses quantum imaging wherein one of said paths is configured to be reflected from said medium and another of said paths is configured avoid said medium, the system further comprising means to interfere photons from the two paths.

In addition to encoding the data storage medium using changes in the relief of the medium, it is also possible to use birefringent materials. For example, an optical system wherein said data storage medium is configured to vary the path length between photons with a first polarisation and photons with a second polarisation which have been reflected by said medium.

The system may further comprise at least one tracking source and tracking detector, said tracking detector being configured to determine if the entangled photon source is positioned correctly by the intensity of the radiation detected from the tracking source.

Also, the system may further comprise means to monitor the shape of the beam of radiation detected by the detection system. The shape of the beam is determined by the distance between the objective lens and the surface of the medium, and thus can be used to optimise focussing.

Both of the above may be used as a feedback mechanism to position the source, optics and detector which together form a quantum optical pick-up.

In a second aspect, the present invention provides an optical retrieval method configured to retrieve data from a data storage medium, the system comprising:
outputting n path-entangled photons, where n is an integer of at least 2;
directing photons from said source to said data storage medium and to a detector system; and
detecting if n photons have been received.

As described above, the present invention allows much smaller features to be read on a data storage medium. Thus, in a third aspect, the present invention provides a data storage medium, wherein said data features have spatial dimensions smaller than the wavelength of the reading light or the diffraction limited spot.

A data storage medium in accordance with an embodiment of the present invention can have features around 830 nm which is the resolution of a CD, or less.

Such features can be defined by optically writing to the disk with n-photon beams. The medium is sensitive to n-photon absorption, which changes the properties of the medium. Such changes in property can affect the surface dimensions, refractive index, birefringence, or reflectivity for example.

Thus, in a fourth aspect, the present invention provides a data storage system configured to store data on a writeable data storage medium, the system comprising:

means to convert data to be recorded into a pattern to be written onto the data storage medium;

a source of n path-entangled photons, where n is an integer of at least 2; and means to direct said path entangled photons to impinge on said medium in accordance with said pattern.

In a fifth aspect, the present invention provides a data storage method configured to store data on a writeable data storage medium, the method comprising:

converting data to be recorded into a pattern to be written onto the data storage medium;

irradiating said medium with a beam of n path-entangled photons, where n is an integer of at least 2; and directing said path entangled photons to impinge on said medium in accordance with said pattern.

In a sixth aspect, the present invention provides a data storage medium, for use with a writable optical data storage device having a source of photons, said medium comprising a material whose properties are sensitive to absorption of n path-entangled photons where n is an integer of at least 2.

In an embodiment of writable data storage medium, the material is a type of photoresist which will respond to absorption of n photons, where n is an integer greater than 2 while still preserving the resolution enhancement provided by such a state. Examples of such materials are Epon® SU-8 and PMMA.

Preferably, the optical retrieval system and the optical storage system will be provided within the same device such that the device can both read and store to a suitable storage medium. The same source and optics may be used for both reading and writing.

So that an n-photon quantum optical pickup does not inadvertently overwrite, erase, or destroy previously written data, the medium preferably has means to activate or deactivate said sensitivity to n-photon absorption. Such means may include a variation of the response to increased optical power, heating, or chemical treatment.

The present invention will now be described with reference to the following preferred non-limiting embodiments in which:

FIG. 3a shows a schematic of a source of entangled photons which may be used in an optical read system in accordance with an embodiment of the present invention, FIG. 3b shows an arrangement which may be used to path entangle the output of the source of FIG. 3a;

FIG. 4a is a photograph of two sources of similar type to that shown in FIG. 3a which have been cleaved and FIG. 4b shows a photo luminance intensity plot against dot energy for photons outputted from the devices of FIG. 4a;

Figure 10:
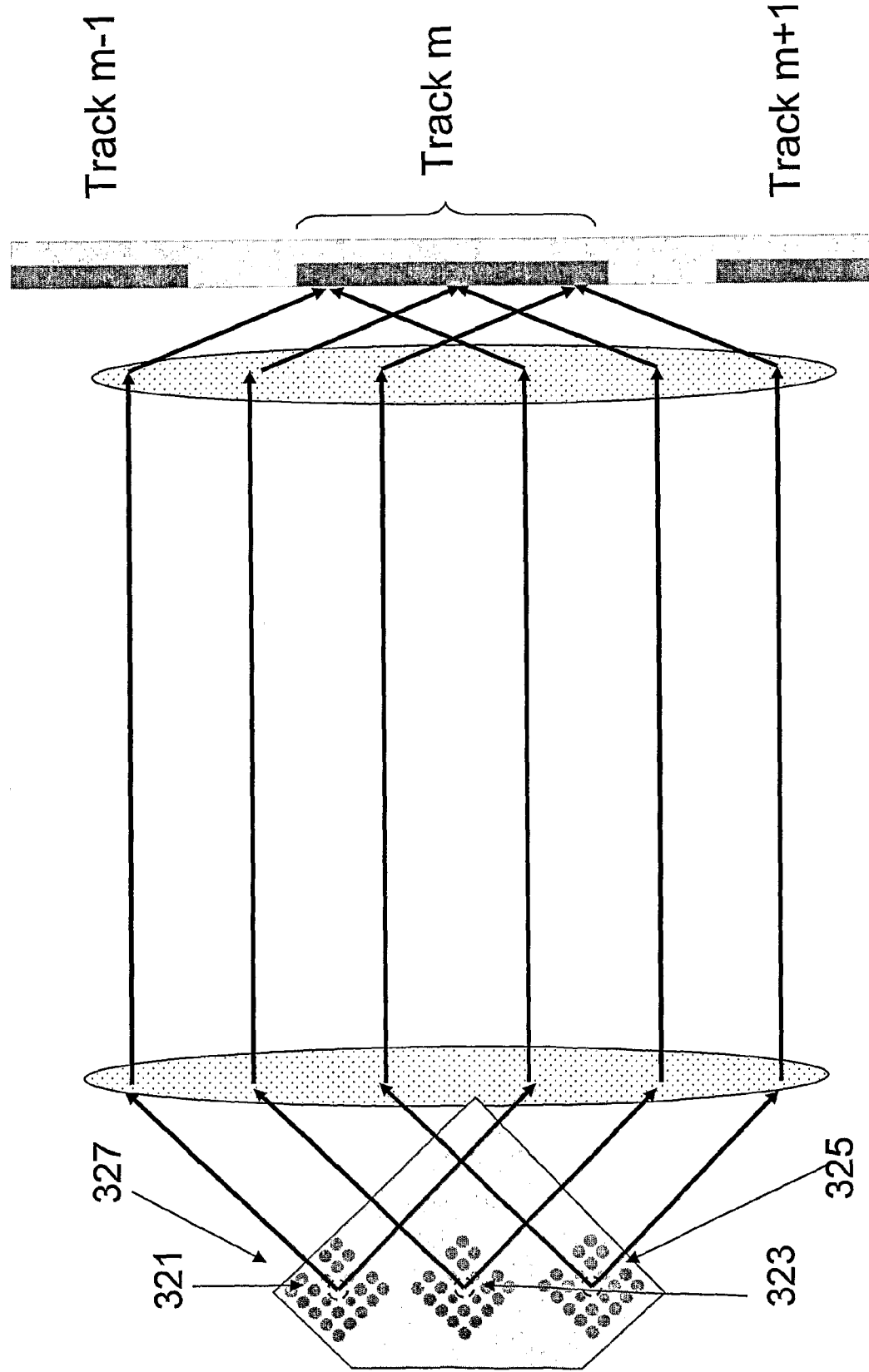
Figure 13:
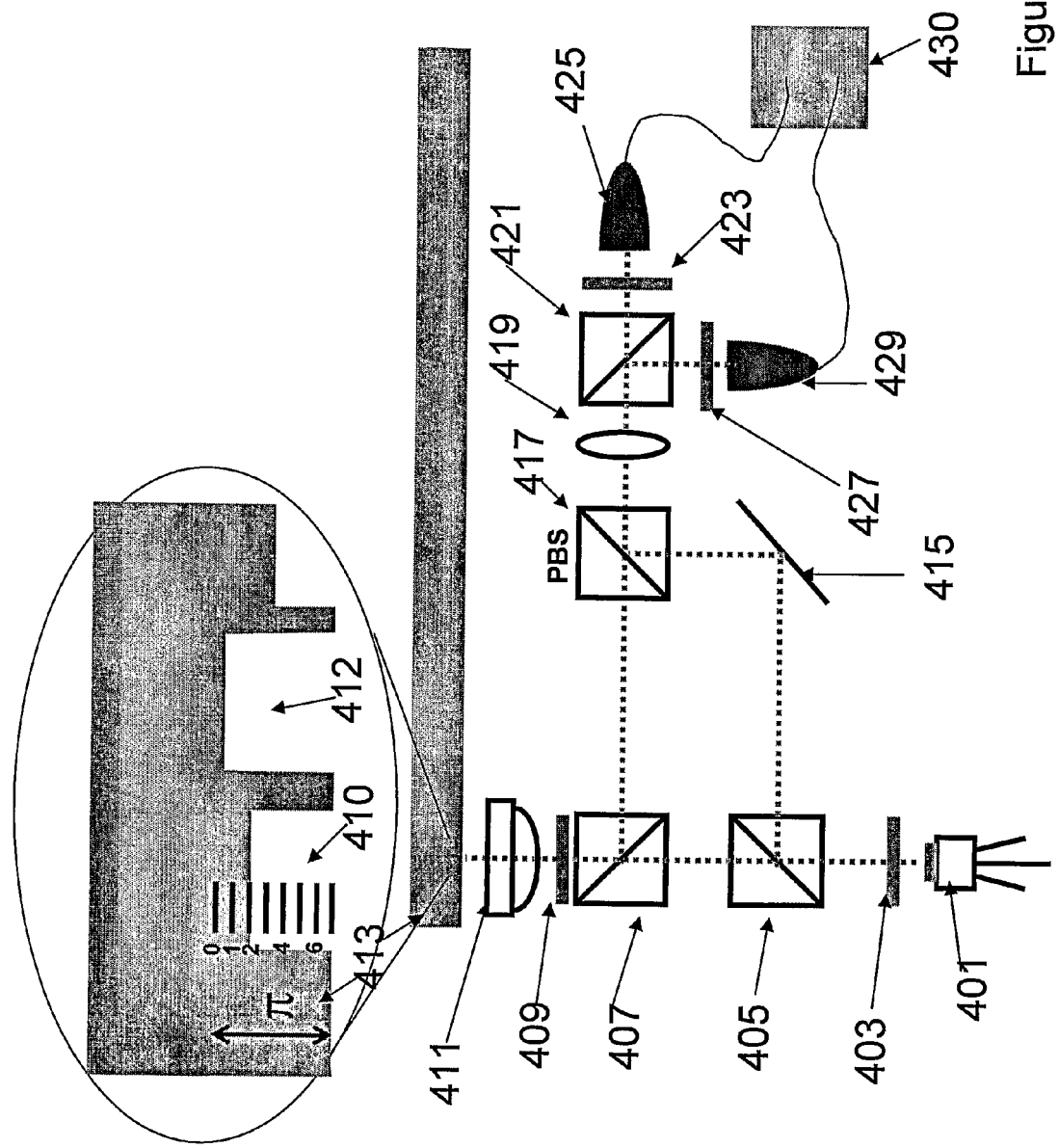
Figure 14:
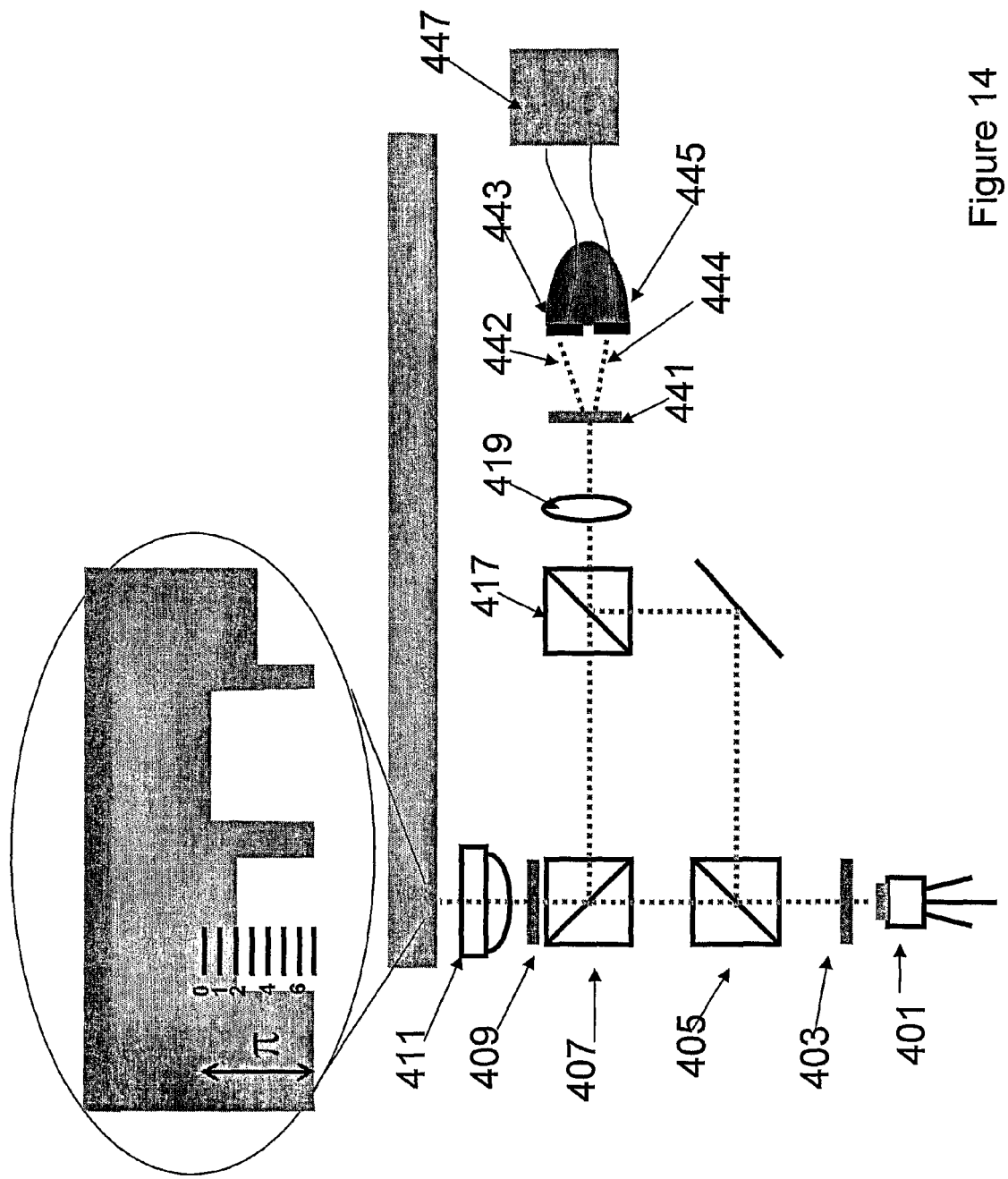
Figure 15:
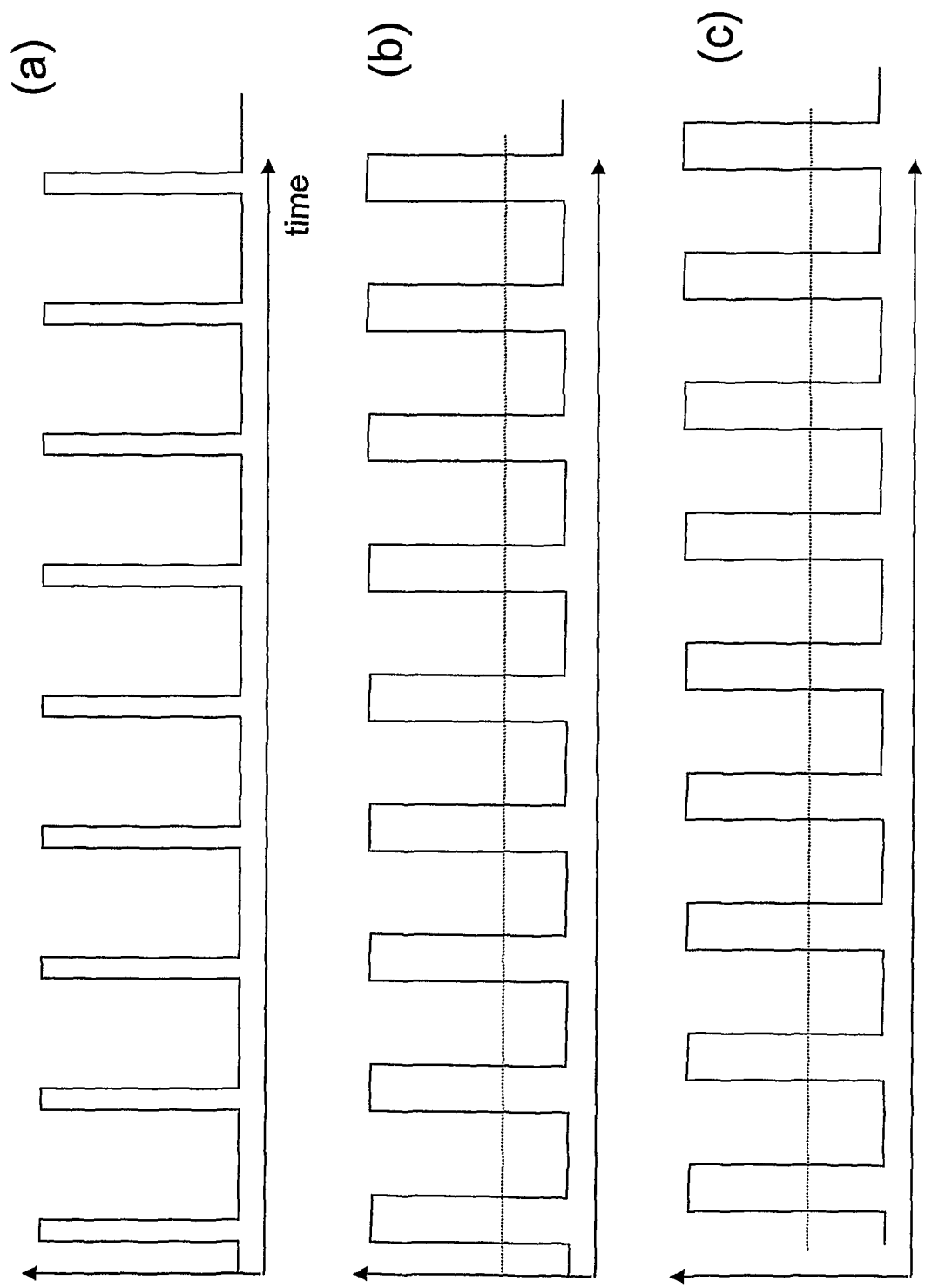
Figure 16:
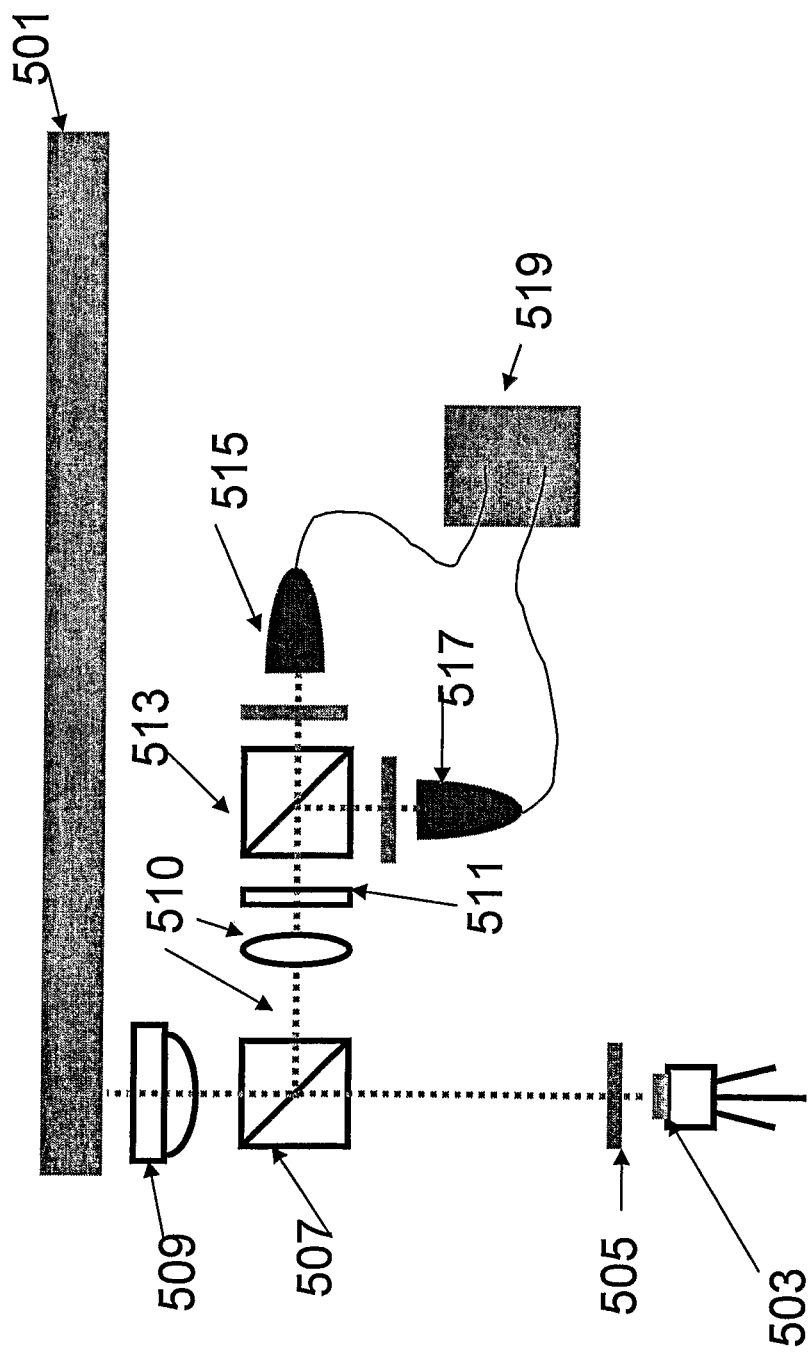

FIG. 10 schematically shows a system in accordance with an embodiment of the present invention which has tracking capabilities;

FIG. 11a schematically shows three detection areas which can be used with the tracking arrangement of FIG. 10, FIG. 11b shows the results for a well focused beam and FIG. 11c shows the results when the beam is not properly focused;

FIG. 12a is a schematic of a gating signal for use with the detector in accordance with an embodiment of the present invention, FIG. 12b is a detection system in accordance with an embodiment of the present invention, FIG. 12c is the output of the detector of FIG. 12b, FIG. 12d is the signal of FIG. 12c which has been shifted by a period and FIG. 12e is the resultant signal obtained by subtracting the signal of 12d from that of FIG. 12c;

FIG. 13 is an optical read system in accordance with an embodiment of the present invention capable of performing quantum imaging to determine the depth of a pit on a recording medium;

FIG. 14 is a variation on the optical read system of FIG. 13 using a detection system incorporating frequency discrimination;

FIG. 15 shows timing diagram for the components of an optical read system in accordance with an embodiment of the present invention, FIG. 15a shows the trigger for the source, FIG. 15b shows the trigger for a first detector and FIG. 15c shows the trigger signal for a second detector; and FIG. 16 shows an optical read system in accordance with an embodiment of the present invention used for birefringent reflection encoding.

Figure 1:
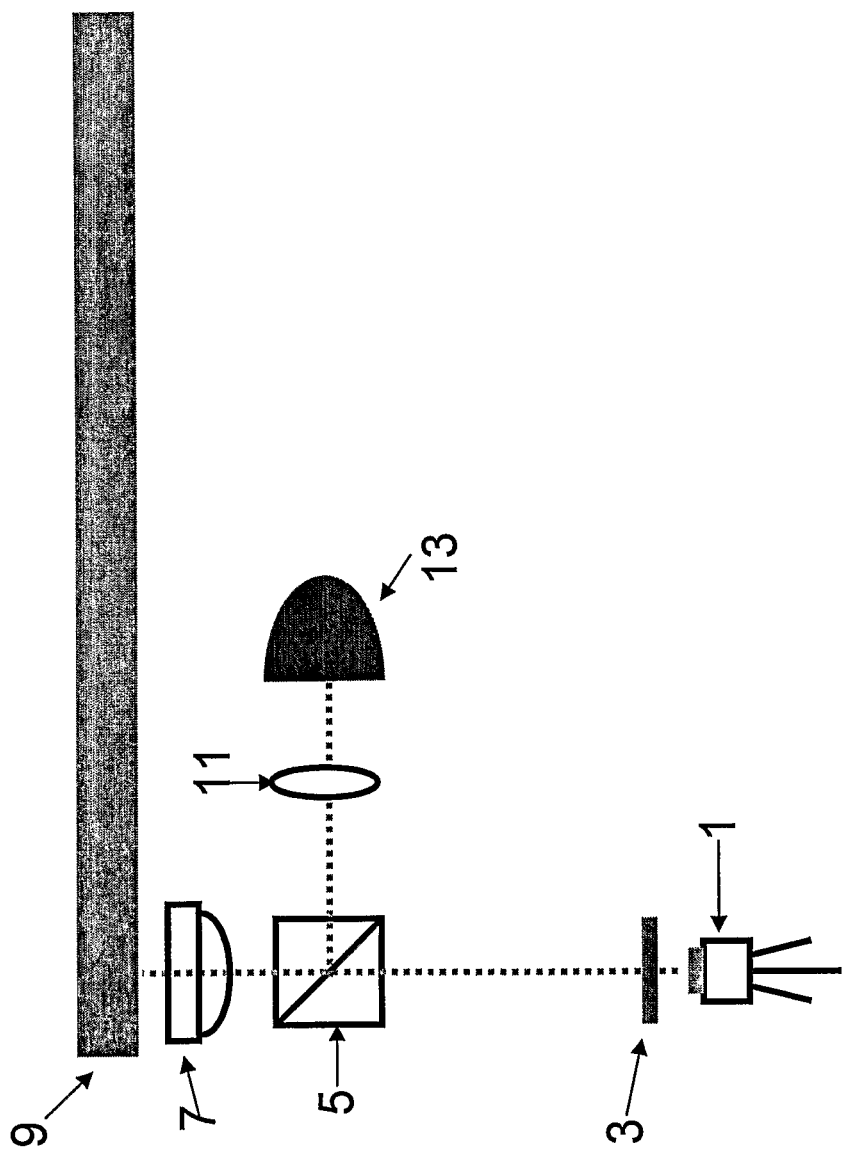
FIG. 1 shows an optical read system in accordance with an embodiment of the present invention.

FIG. 1 is a schematic of a system in accordance with an embodiment of the present invention, the system comprises a source of entangled photons 1. The source will be described in more detail with reference to FIGS. 3a and 3b. The source 1 initially outputs polarisation entangled photons which are then converted to path entangled photons with the same polarisation. This will be described in more detail with reference to FIG. 3b. Filter 3 filters out all frequencies except those of the entangled photons.

The path entangled photons then enter polarisation beam splitter 5 which passes the entangled photons through to lens 7. Lens 7 then focuses the path entangled photons onto to the data storage medium 9. The photons are reflected back into lens 7, then into polarising beam splitter 5. Due to reflection from the data storage medium 9, the polarisation of the reflected photons has changed and hence the photons are this time reflected by beam splitter 5 into lens 11 and finally though to photon detector 13. The polarising beam splitter 5 may be replaced by a non-polarising beam splitter. The system will work in the same way, but will this time use non-deterministic transmission and reflection at the beam splitter.

The data storage medium has a pattern which is made of pits and lands which are used to encode data on the recording medium. For example, the pits being used to encode bit "0" and the non-pitted areas or "lands" being used to denote bit "1". In this embodiment, the data storage medium is a disk. However, other formats for optical storage may also be used.

The data storage medium 9 may be configured such that the pits pierce into a less reflective substance and hence the reflected signal from the pits is considerably lower than the reflected signal from the lands. Thus the probability of a photon pair being reflected by a land is considerably higher than that of a photon pair being reflected by a pit. Thus, by monitoring the photon pair count at the detector 13 it is possible to distinguish between a pit and a land or bit 0 and bit 1.

The photon detector is a multiphoton detector which can distinguish the number of photons being received. If the source outputs an entangled photon pair then the photon detector is capable of distinguishing between 1 and 2 photons. Thus, it can determine if it has detected a stray photon or if it has detected a photon pair which has arisen from reflection from the recording medium. The detector will be described in more detail with reference to FIGS. 12 to 15.

The detector 13, optics, and light source 1 form an optical pick-up, which has a controlled position relative to the surface of the data storage medium 9. Rotation of the disk 9 provides control in the tangential disk direction, and a motor controls the radial position of the pick-up to change between tracks. Finally the distance between the pick-up and the disk 9 can be controlled to optimize focusing, and switch between data storage layers.

In general, the resolution of such a system is enhanced, because the properties of entangled photons pairs (and more generally multi-photons) are partially equivalent to single photons with double (or more generally multiple) the energy. Thus an entangled photon source operating at 800 nm can generate 2-photon interference with effective wavelength of 400 nm. Such an enhancement is similar to that achieved by changing the laser from standard DVD, to the higher capacity HD DVD, for example. Alternatively an entangled pair source operating at 400 nm can generate interference with an effective wavelength of 200 nm, enabling an increase in optical data storage capacity.

Existing error correction techniques for DVDs requires no more than 1 read error in 10000 for smooth playback. To achieve this level of statistical error, the contrast between the bit 0 and bit 1 read values must be ~4 times the noise level. Thus the average number of pairs detected for '1' must be at least 16, for the case when no signal is detected for '0' data bits.

As the source 1 and detector 13 both have ~75% efficiency, the corresponding probability of both photons being collected is 0.31. Thus 52 cycles are required to read a single bit.

The bit rate of the system is limited by the detector. The detector is described later with reference to FIG. 12. The detector can operate at multi-GHz ranges which allows the system to operate at ~10 GHz.

As described above, statistical noise acquired with measuring individual pairs of photons requires multiple readout of the same bit. Therefore the system frequency, together with the number of readout cycles, determines the maximum data transfer rate can as follows. As the above description shows that 52 cycles may be requires to read a single bit, the corresponding maximum data transfer rate is therefore 192.3 Mbs, which is far greater than that used in existing HD-DVD technology for example, where the data transfer rate is up to 36.5 Mbs.

However, because of the non-Poissonian nature of the light source, statistical noise may be reduced. For example, for a high contrast disk, the probability all photons are reflected can approach 1. In this case, noise is limited only by the efficiency of the source, optics, and detector. It is therefore possible that the system may operate satisfactorily at lower frequencies, for example ~1 GHz, or that even higher data transfer rates can be achieved.

The use of entangled light can be combined with other techniques to increase the storage density, such as multiple layers, or encoding multiple bits as different pit depths or angles. In each case the use of entangled light brings an improvement upon the density achieved with ordinary light. For example, the system may also be configured such that the angle at which the photon pairs are reflected from the data storage medium indicate the bit value stored on the recording medium.

Figure 2:
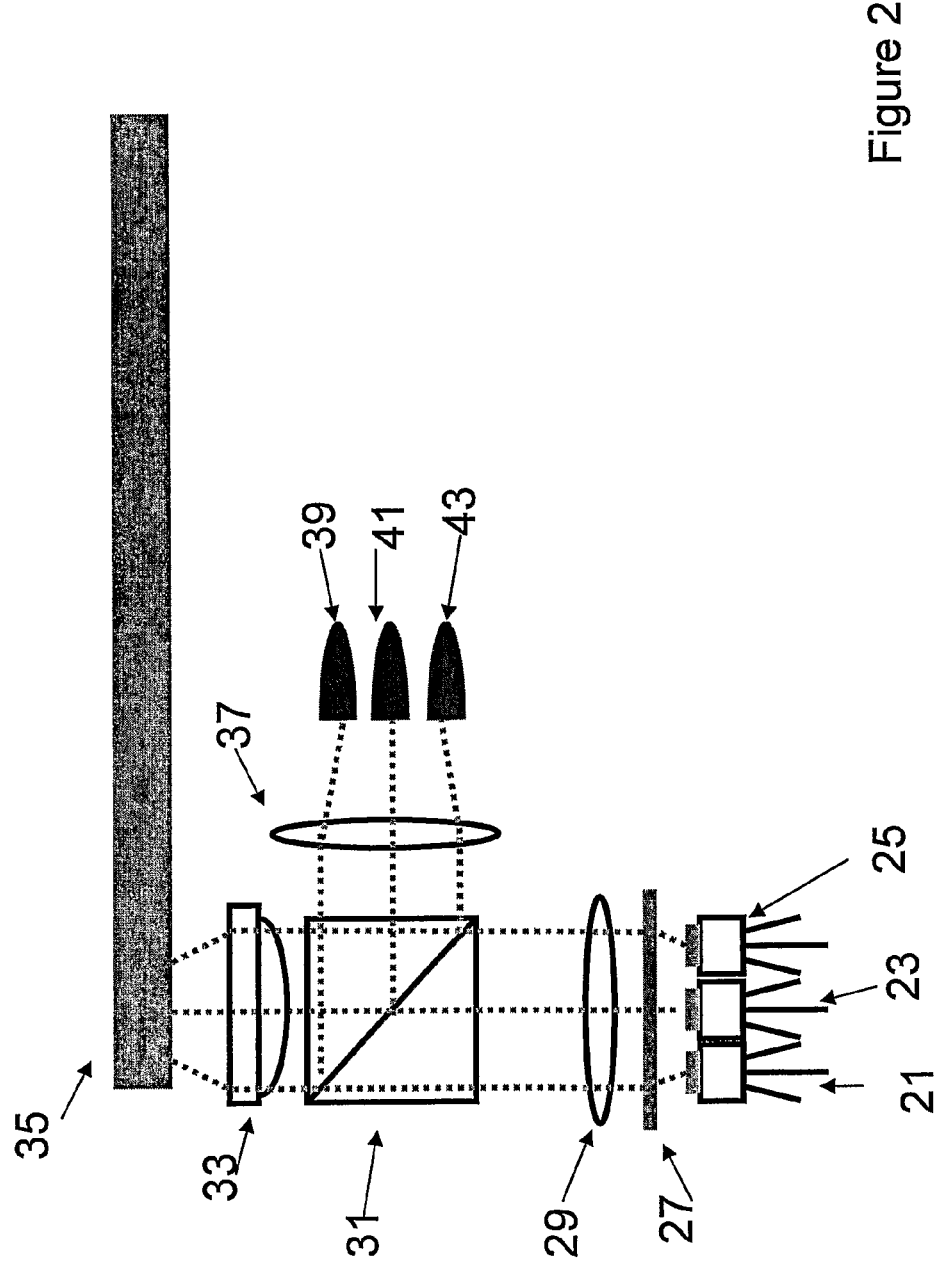
FIG. 2 shows a further optical read system in accordance with another embodiment of the present invention which has multiple entangled pair sources.

The data transfer rate may be increased by using multiple sources as shown in FIG. 2. Three path-entangled photon pair sources 21, 23, 25 are driven simultaneously and output 3 sets of path-entangled photon pairs which are filtered by filter 27 to remove any background signal. The three photons paths are then collimated by collimating lens 29.

Each photon pair follows a different parallel path and each pair passes through polarising beam splitter 31 to lens 33. Lens 33 focuses the three photon pairs onto three spots on the optical disk 35 surface. The spot positions will preferably be different points on the same track on the disk, close enough together to utilize the same objective lens.

Reflected light from all three spots is directed via polarising beam splitter 31 and lens 37 into an array of multi-photon detectors 39, 41 and 43. In this example, each of the three detectors 39, 41 and 43 measures photon pairs from each of the three sources. Using the system of FIG. 2, measurement of the same bit is repeated 3 times, using separate sources 21, 23 and 25 and detectors 39, 41 and 43, and without increasing the system operating frequency. The result is that the disk can be spun 3 times faster to achieve the same noise properties as a single sources system. Thus the data transfer rate is increased 3-fold.

The position of the focussed spots for sources 21, 23, and 25 are slightly different. Thus source 21 probes different data to source 25. For example, source 21 could focus on a desired bit slightly before rotation of the disk enables source 25 to access the same bit. Read results from all detectors can be buffered and added appropriately, to compensate for the delay.

A variation of this method is to spectrally isolate the reflections of independent sources, rather than the spatial isolation technique shown in FIG. 2. For spectral isolation, all sources operate at different wavelengths, and can focus to the same spot. The reflected beams are spectrally separated, using for example a transmission grating, and directed separately to independent multi-photon detectors.

FIG. 3a is a schematic of a source of entangled photons. The source is of the type described in Stevenson et al, Nature 2006, Young et al New Journal of Physics 2006, Stevenson et al, Optics express 2007, and GB 2386470 which is herein incorporated by reference.

The source comprises a quantum dot 53 which is located within an optical cavity to enhance the emission efficiency. The quantum dot is formed at the centre of a cavity. The optical cavity is defined by lower Bragg mirror 51 which is located below the quantum dot and upper Bragg mirror 55 located above the quantum dot 53. The device is incorporated into an LED structure for electrical operation such that the quantum dot is provided iii the insulating section of a p-i-n device. Above the upper cavity is located top contact 57 which is used to apply a field across the quantum dot to trigger the release of pairs of photons from the quantum dot in response to a trigger voltage. Entangled photons are produced from bi-exciton decay where a biexciton formed by exciting two electrons and two holes in the quantum dot first decays to an exciton to output a first photon and then the exciton decays outputting a second photon.

An aperture 59 is provided in the top contact 57 to allow photon pairs to exit from the source. Quantum dots have advantages over other sources of entangled photons, as they are semiconductor devices that could be mass-produced cheaply.

Further improvements to the cavity design can allow efficiencies in excess of 75%.

Quantum dots naturally produce pairs of polarization entangled photons. That is a pair of photons are emitted with identical linear polarization (either horizontal [H] or vertical [V]) into a superposed state, and this polarization is undefined until one of the photons is measured.

However, to use entangled photons to enhance imaging, the photons must be entangled in position, so called path entangled photons. This is easily achieved as shown in FIG. 3b. In FIG. 3b, a source 61 of polarisation entangled photons emits a pair or photons to polarising beam splitter 63. Both photons exit the same port, either 1 or 2. Thus the final state is a superposition of having 2 photons exit port 1 and follow a first path, or 2 photons exit port 2 and follow a second path. A half wave plate 65 rotates the polarisation of photons exiting port 2, which can allow interference as now all photons are the same linear polarization.

Figure 4:
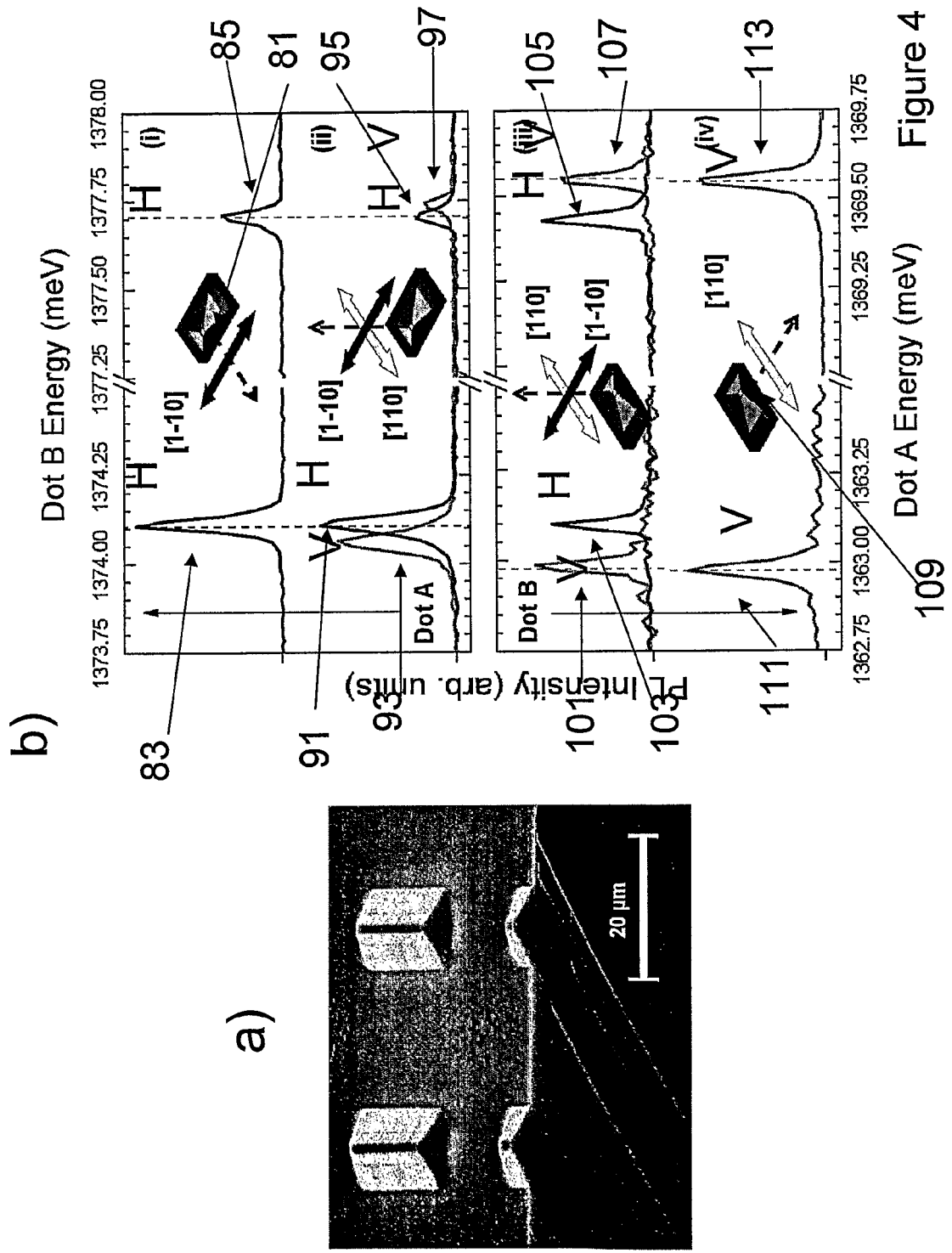

FIG. 4a is a picture representing a further source of entangled photons. The source comprises a quantum dot and has a waveguide formed in a ridge structure. Due to the nature of the optical dipole for H, or V polarized photons, both can be emitted vertically, but each can only be emitted in one direction in the plane.

The results from two similar structures are shown in FIG. 4b, each containing a single quantum dot A, or B. FIG. 4b (i) shows the photoluminescence results from the device of FIG. 4a which has been cleaved and the output collected from the cleaved edge.

The position of the cleave is shown in the inset picture of the device in FIG. 4b(i). Only the horizontally polarised photons from dot A are collected from the cleaved edge 81. The lower 83 and higher 85 energy emission lines correspond to the first (exciton) and second (biexciton) photons respectively.

FIG. 4b(ii) shows emission from dot A collected from the top of the structure. As emission collected from the top of the structure can contain both horizontally and vertically polarised, two orthogonally polarised peaks 91 and 93 are seen around the energy of the first photon (exciton) transition and similarly two orthogonally polarised peaks 95 and 97 around the energy of the second (biexciton) transition.

Thus a biexciton in dot A may decay via emission in the vertical direction of a pair of vertically (93 & 97) or horizontally (91 & 95) polarised photons, but may decay only via emission of a horizontally polarised photon pair (83 & 85) in the direction of the cleaved facet 81.

The situation for dot B is similar, and differs due to the orthogonal direction of the cleaved facet, as shown in the inset to 4b(iii).

FIG. 4b(iii) shows the emission from dot B collected from the top of the structure, which is very similar to that described for dot A in FIG. 4b(ii).

In FIG. 4b(iv), emission is collected from facet 109. Since radiation is only collected from the side, only vertically polarised photons can be emitted from this facet and only V polarised peaks 111 and 113 corresponding to the first (exciton), and second (biexciton) transition of the cascade are observed.

Thus, since it is possible to emit only horizontally polarised photons from one side of the device and vertically polarised photons from the other side of the device, a quantum dot that can emit polarisation entangled photons vertically, can emit photon pairs in a superposition of two orthogonal directions in-plane. Such a device emits path-entangled photons in the plane of the layers. This can be enhanced by suppressing emission vertically using an optical cavity. Such a device avoids the need for the beamsplitter as described with reference to FIG. 3b.

We note that although emission polarisation is designated H or V, as shown in FIG. 4b, emission is always polarised in the plane of the growth layers. Thus viewed from the facets, H and V polarisations are equivalent.

Due to the polarisation dependent emission energies of the emission lines for dots A and B, emission is not entangled. However the directional effect is the same for dot that emit entangled photons.

A possible way of utilizing this directional property is shown in FIG. 5a. FIG. 5a shows a quantum dot (not visible) embedded in a photonic crystal. The photonic crystal consists of a semiconductor membrane of a thickness comparable to the wavelength of the light. The period and diameter of the holes 121 are also comparable to the wavelength of the light. The pattern of the holes may be hexagonal or triangular as shown in FIG. 5a or square as shown in FIG. 5b.

The cavity in which the quantum dot is located comprises a missing hole at 123 to confine the optical mode close to the quantum dot. The cavity may also have modified surrounding holes for example of a smaller diameter and displaced to increase the distance from the centre of the cavity. The wavelength of the optical mode within the cavity should be resonant with that of the quantum dot. In this example, two waveguides are created 125 and 127 which are at right-angles to each other. The waveguides 125 and 127 are created by missing holes along the waveguide direction. Waveguide 125 is configured to allow transmission of a photon pair polarised along the Γ-M direction of the photonic crystal, i.e. $X_1^m, X_2^m$ where $X_1$ and $X_2$ denote the photon from the first transition and the second transition respectively and the pair are emitted along Γ-K direction.

Waveguide 127 allows a photon pair polarised along Γ-K ($X_1^k, X_2^k$) to be emitted along the direction Γ-M. The photons emitted due to a cascade are a superposition of both photons with Γ-K polarisation and both photons with Γ-M polarisation. Thus photon pairs are emitted along entangled paths via waveguides 125 and 127.

Two facets for out coupling of the emitted photons are cleaved at right-angles to the two waveguides 125 and 127. Unpatterned material may separate the waveguide from the facet. Alternatively, the facets may be cleaved at an angle to control the numeral aperture of the source.

A further alternative is to shape the waveguides to allow both waveguides to exit on a single facet. In this case, it is advantageous for the waveguides to be spatially separated along the facet, so that the emerging entangled photons are spatially separated also.

FIG. 5b shows a square lattice. This has the advantage that the waveguides are symmetric with respect to the symmetry of the photonic crystal, and may therefore be more uniform. Although no complete photonic bandgap can be achieved with a square array of holes, a photonic bandgap can be provided for photons polarised in the plane, which is of importance here.

Figure 5:
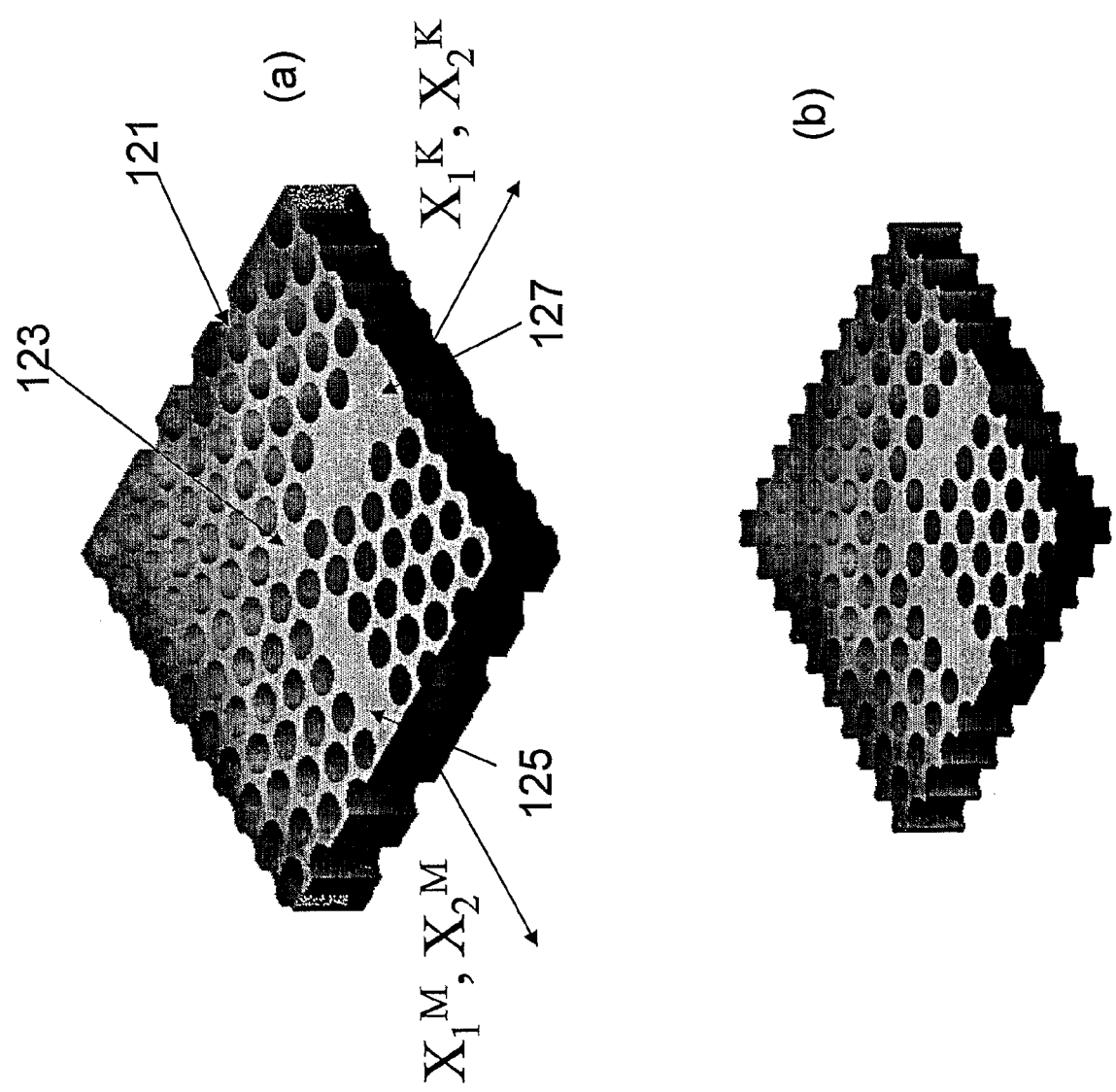
FIG. 5a is a schematic of a photonic bandgap structure with a triangular lattice which may be used in accordance with the optical read system of the present invention and FIG. 5b is a similar structure with a square lattice.
Figure 6:
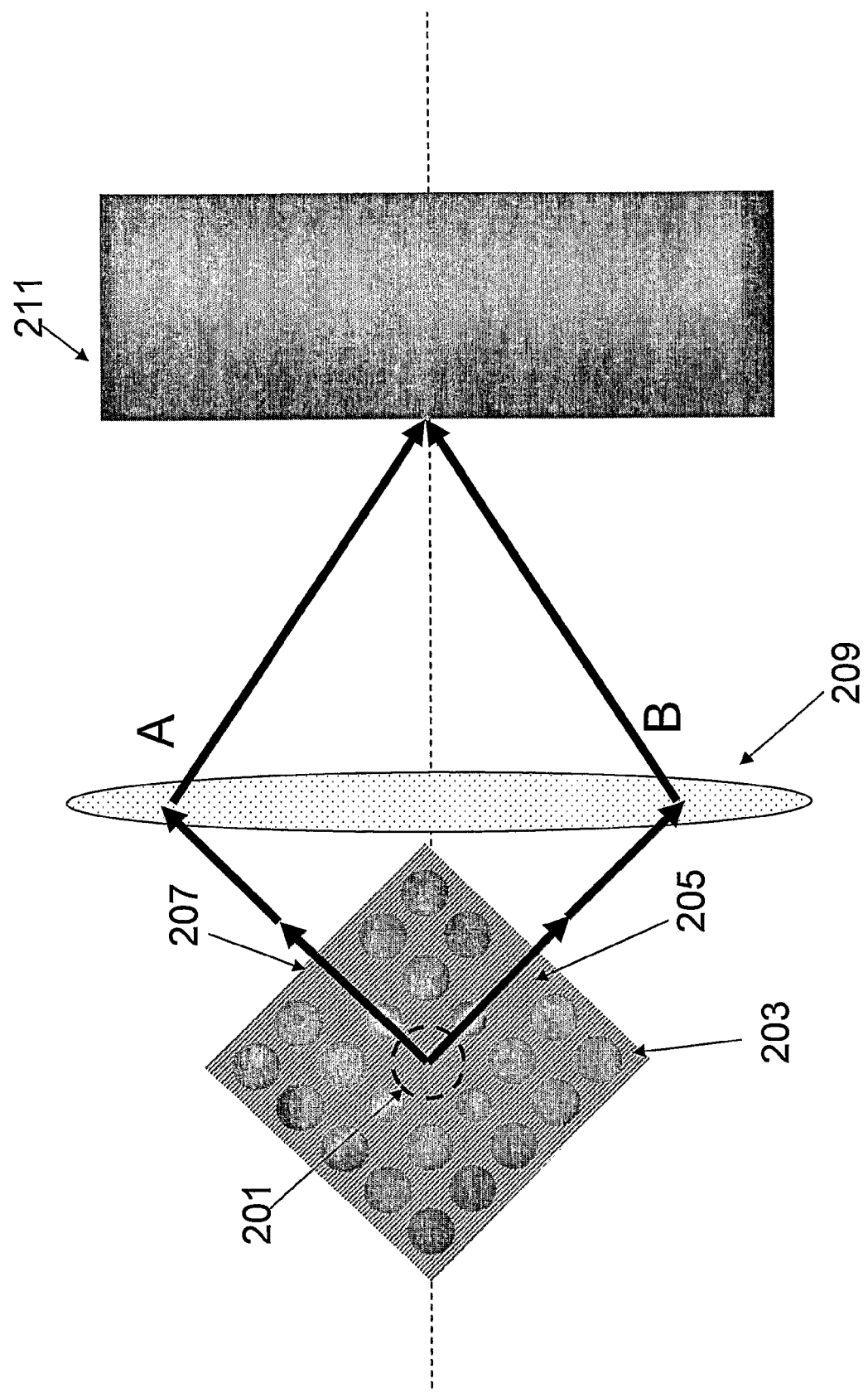
FIG. 6 is a schematic of an optical focussing system in accordance with an embodiment of the present invention using a photonic bandgap structure to achieve path entanglement of the outputted photons.

FIG. 6 shows how the source previously described in the photonic bandgap structure of FIG. 5 can be used in the system. The source 201 is provided within photonic bandgap structure 203 which has a first waveguide 205 and a second waveguide 207. Pairs of photons outputted from source 201 have a state which is a superposition of two photons with a first polarisation exiting through path 205 and two photons with a second polarisation exiting through path 207. Therefore, the pair of photons are path entangled upon leaving the source and no further polarising beamsplitter or other such equipment is required.

The two photon paths A and B are then focused by lens 209 onto the surface of data storage medium 211. Radiation is reflected back from the data storage medium 211 and into a detector and detected as described with reference to FIG. 1.

Figure 7:
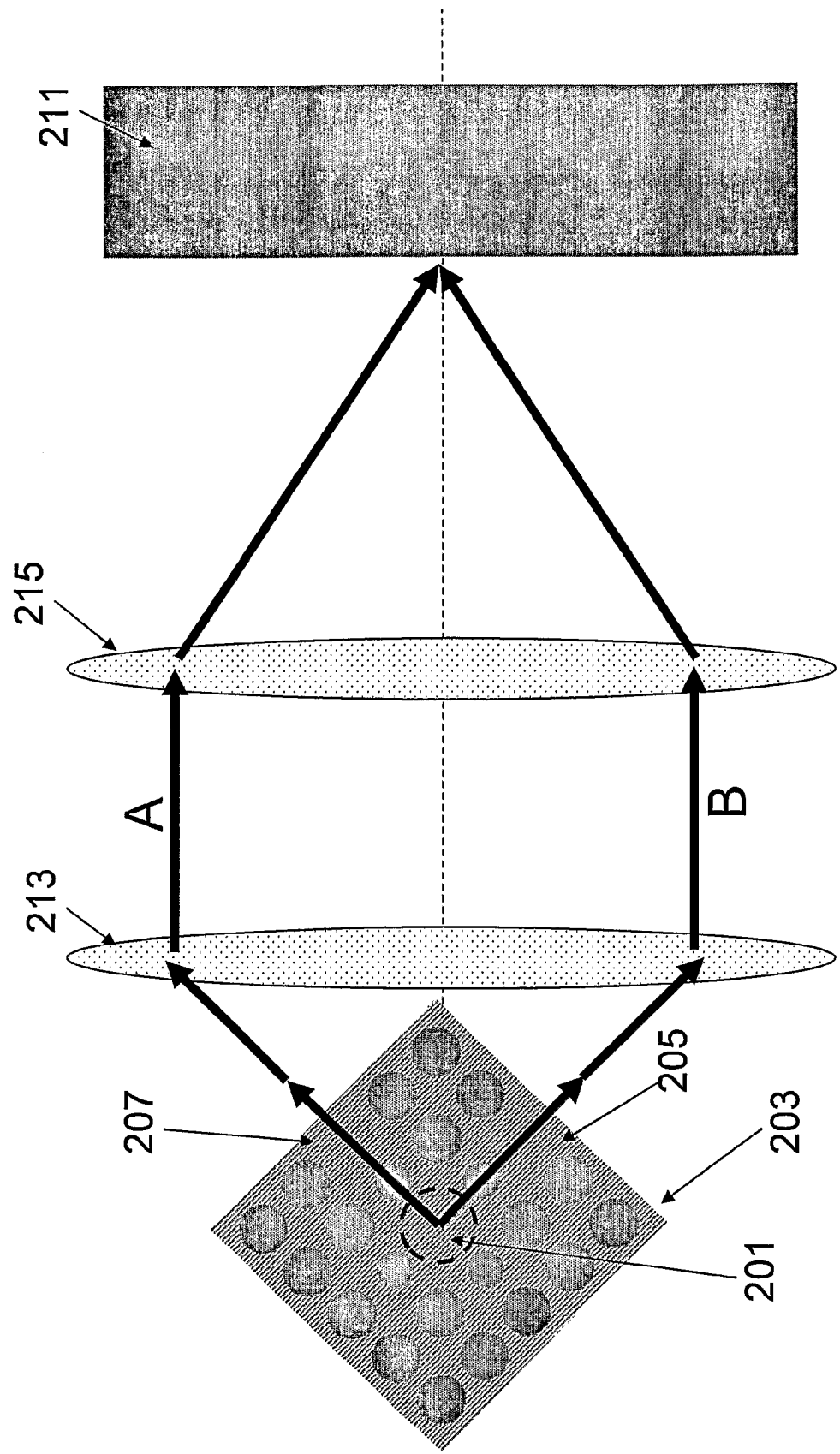
FIG. 7 is a variation on the system of FIG. 6 using a dual lens arrangement.

FIG. 7 shows a variation on the system of FIG. 6. To avoid any unnecessary repetition, like reference numerals will be used to denote like features. In FIG. 6, there is a single lens 209. In FIG. 7, there is a pair of lenses 213 and 215. Lens 213 is positioned to be a collimating lens to collimate paths A and B and lens 215 is provided to focus collimated beams onto the data storage medium 211.

In FIG. 7, paths A and B and the tracks of the disk lie in the same plane. This is because with two paths, resolution enhancement can only be achieved in one spatial direction. Since the data spacing is typically shorter than the track spacing optical disks, it is more advantageous to use this geometry.

The wave function used to represent a general two-path-entangled photon state is known as a NOON state since N photons can take the first path and 0 the second or vice versa. This wavefunction is shown below, where subscripts A and B denote the first and second paths respectively. Quantum dots readily produce entangled light with N=2. However, if higher order NOON states can be generated, this will further improve the resolution combined with suitable N-photon detectors.

$$\psi=(|N_A 0\rangle+|0 N_B\rangle)/\sqrt{2}=(|2_A 0\rangle+|0 2_B\rangle)/\sqrt{2}$$

Figure 8:
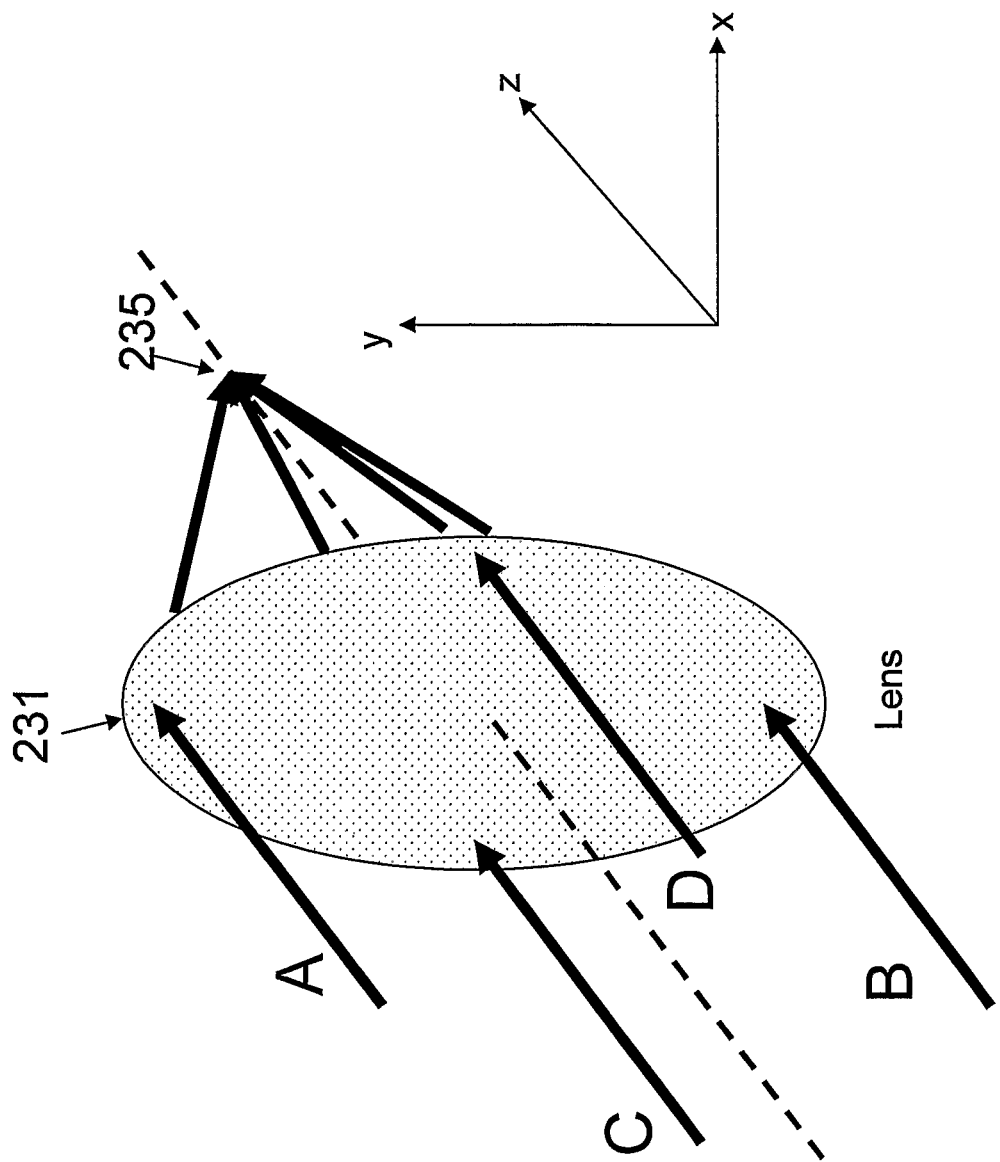
FIG. 8 is a read system accordance with an embodiment of the present invention using four path entangled states to achieve enhanced resolution in two dimensions.

FIG. 8 shows a four-path entangled state for 2D resolution enhancement. As increasing the number of entangled photons N increase the resolution, so does increasing the number of entangled paths M. In FIG. 8, there are four possible entangled paths A, B, C and D. Two photons will take the same path from a superposition of four possible paths. Each path is incident at four separate points on a lens 231. The lens 231 focuses the four paths to a point 235 on the data storage medium (not shown). The result is that the focussed bi-photon spot will have enhanced resolution in both the X and Y dimensions. The wavefunction for such an entangled state is shown below.

$$\psi=(|2_A 000\rangle+|0 2_B 00\rangle+|00 2_C 0\rangle+|000 2_D\rangle)/\sqrt{2}$$

Figure 9:
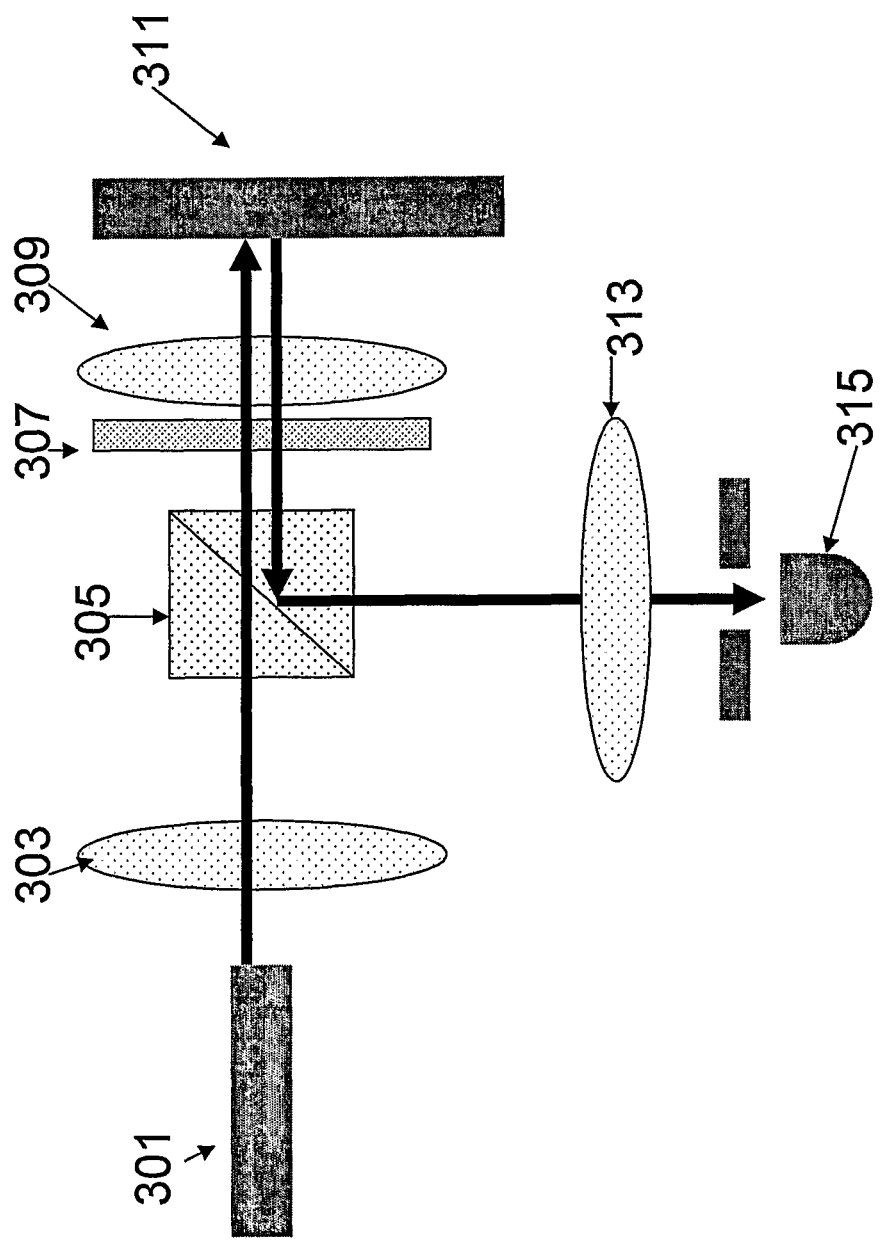
FIG. 9 shows a read system in accordance with a further embodiment of the present invention.

FIG. 9 shows a schematic of a detection geometry for a quantum optical pickup. The system comprises a source 301 which may be any of the sources previously described either using a photonic bandgap or using the beamsplitter arrangement of FIG. 3b. The outputted radiation is collimated by lens 303 and the radiation passes through the polarising beamsplitter 305 which is configured to pass the radiation first through quarter wave plate 307. Quarter wave plate 307 converts the polarisation to circularly polarised radiation. Lens 309 focuses the light on the surface of the data storage medium 311. The reflected radiation then passes back through quarter wave plate 309 and is converted back into linearly polarised radiation. Due to the phase change on reflection, it is orthogonally polarised in comparison with the input photons and thus is reflected by beamsplitter 305 into lens 313. The light is focused onto bi-photon detector 315 which in the case of photon pairs is able to distinguish between a photon pair and a single photon thus being able to determine the presence of the received entangled photon pairs.

As described with reference to FIG. 1, it is necessary for the quantum optical pickup to accurately track the disk. Conventional DVD technology uses a 3-beam tracking system. In a conventional system, the laser is split into three beams using a transmission grating and then focused into three spots on the media surface. This system cannot be used in the present invention because splitting the entangled beam will destroy the entanglement. Therefore, in the system of FIG. 10, three distinct entangled photon sources 321, 323 and 325 are located in source head 327. These sources could be separate, or integrated on the same chip. Alternatively, the sources could be stacked vertically rather than being placed side-by-side. Thus, the sources could be grown epitaxially one on top of each other.

In an alternative arrangement, two conventional light sources, for example lasers, could be used for tracking besides the entangled photon source.

Figure 11:
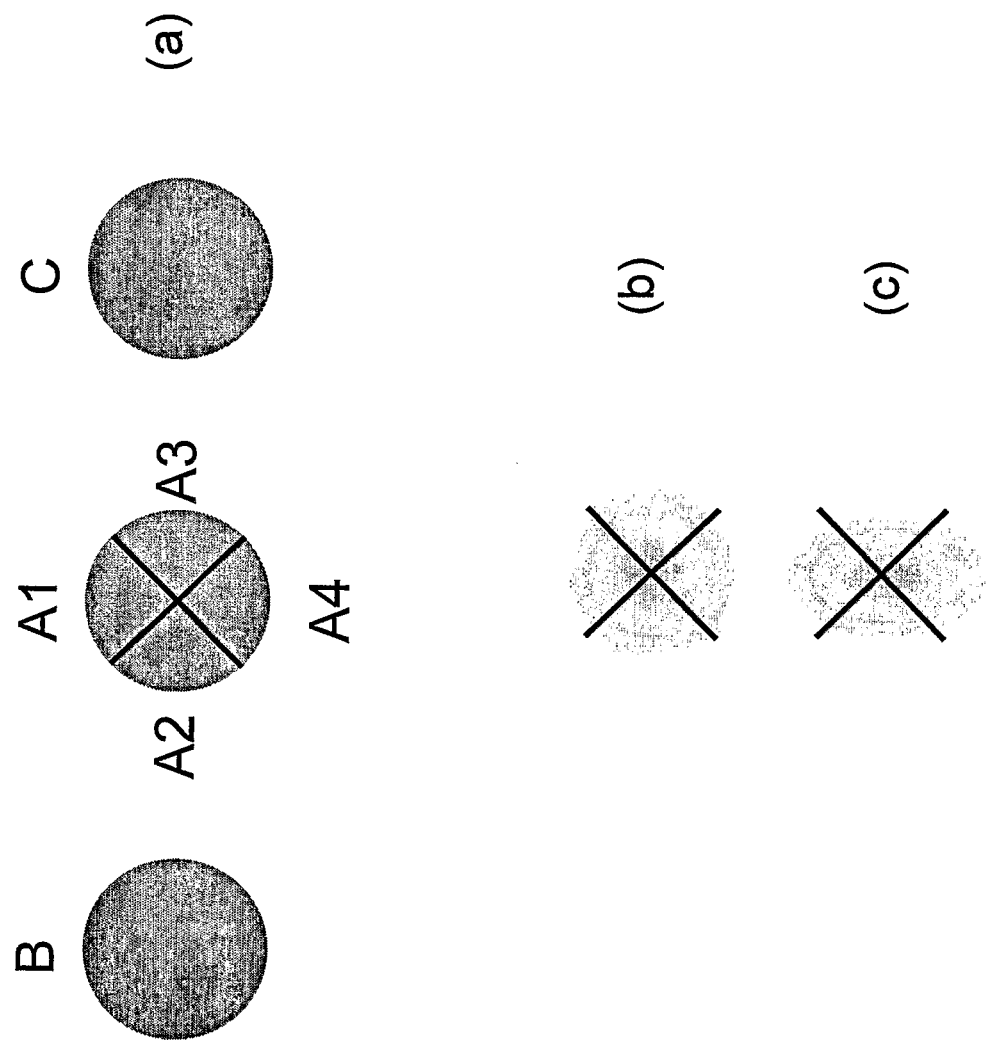

Using an integrated array as shown in FIG. 10 has the advantage that the three sources can use the same lens and optics. The sources 321, 323 and 325 are spaced so that the main read beam is focused onto the centre of central track, track M and the second and third tracking beams are provided at the edges of track M. FIG. 11 shows how the system described with reference to FIG. 10 may be used to achieve correct tracking. FIG. 11a shows three detector areas A, B and C. Area A collects light reflected from the main (data) photon beam (the beam outputted by source 323 of FIG. 3). Areas B and C are used to detect light from additional tracking beams (the beams emitted by sources 321 and 325 of FIG. 10). Areas B and C are located at either side of area A. Areas B and C monitor reflected multi-photon intensity of the tracking beams. By comparing this beam with the signal beam, a feedback circuit can be constructed which moves the lens radially centring the beam on the data track.

Detector area A is sub-divided into four areas, A1, A2, A3 and A4. These areas monitor the shape of the focussed signal beam. If the reflected beam is passed through a cylindrical lens, then the focus spot should be symmetric only for one distance of the objective lens from the surface of the recording medium. If more multi-photons are detected in areas A1 and A4 than areas A2 and A3, then the beam is elongated vertically as shown in FIG. 11c and feedback circuit can then be used to adjust the distance of the lens from the medium accordingly. If the beam is focused correctly, it should be circular as shown in FIG. 11b.

Although detection area A is sub-divided, this does not affect the detection efficiency of the data. For example, if a single pair entangled photon is detected with a single photon on A2 and single photon on A3, then a coincidence between A2 and A3 reveals the presence of bi-photon data. Such a detection event however does not cause a bi-photon detection event in A2 or A3 alone. Therefore, it does not contribute to the signal for the feedback circuit. However, the feedback circuit can measure bi-photons collected for a number of data bits to allow sufficient precision for accurate tracking.

The individual areas A1-A4, B and C may be provided by independent detectors or an integrated multi-detector, fibre optic tips leading to detectors or a combination of these methods. Time multiplexing the detection areas into a single detector is also another possibility.

FIG. 12 schematically shows a detection system in accordance with an embodiment of the present invention. The detector as shown in FIG. 12b comprises an avalanche photodiode 51 provided in series with a resistor 53.

An input signal as shown in FIG. 12a may be applied. The voltage output dropped across the resistor 53 is first input to power splitter 55. Power splitter 55 divides the output signal into a first part as shown in FIG. 12c and a second part. These two signals are then output via ports 57 and 59 of power splitter 55. The signal which is output via port 59 enters a delay line 56 which serves to delay the signal by a duration equal to the gating period. The delayed signal is shown in FIG. 12d. The first part of the signal and the delayed second part are then fed into hybrid junction 61. Hybrid junction 61 combines the first and the delayed second parts of the signals with 180° phase shift to give the output shown in FIG. 12e.

As can be seen in FIG. 12c, the detection of a photon by APD 51 produces an avalanche signal 73. This avalanche signal is then repeated one period later in the trace of FIG. 4d. By combining 12c and 12d, a peak 77 and a dip 75 are seen in the trace of FIG. 12e which indicates the presence of a photon. The provision of a positive peak followed by a negative dip (or a negative dip followed by a positive peak dependent on the configuration of the equipment) allows a clear signature indicating the detection of a photon.

A preferred mode of detection is to test for both the presence of positive peak 77 and negative dip 75 in the output signal. Alternatively, however it may be more convenient to test for just the positive peak alone or just the negative dip alone. The peaks or dips may be detected using discrimination techniques. Discrimination techniques use a discriminator level. Voltage signals which are larger than said discriminator level are assumed to be due to detection of a photon.

The power splitter 55 may be of the type which is sold under part number ZFRSC-42+ from Mini-circuits and the hybrid junction is also available under part number ZFSCJ-2-4 which is also available from Mini-circuits. The exact delay can be realised by using two co-axial cables with two different lengths that link the power splitter and the hybrid junction. It should be noted that the combination of the power splitter 55, the delay line 56 and the hybrid junction 61 may be integrated onto a single printed circuit board.

Note that for very high detection rates, and very high efficiency detectors, sequential detected of two or more photons would lead only to a single positive pulse at the beginning of the sequence and a single negative pulse at the end of the sequence. In the standard self-differencing mode this would result in apparently only a single photon detection. However, detecting both the positive and negative pulses would indicate a run of photon detection events and no efficiency would be lost.

The present invention may also be used to determine more than one value from a pit by using an imaging system. For example, one scheme to store data on a disk encoded bits is the depth of the pits on the surface. Photon source 401 emits a pair of polarisation entangled photons as previously described. Filter 403 filters out radiation which does not arise from source 401. The filtered radiation then enters polarising beamsplitter 405 where the path is split into two. Path one passes through the beamsplitter and since this now consists of horizontally polarised photons due to the action of beamsplitter 405, it passes through second polarising beamsplitter 407.

The horizontally polarised photons pass through quarter wave plate 409 which converts the polarisation to circularly polarised light. The circularly polarised light is then focused by lens 411 onto the surface of recording media 413.

Data storage medium 413 is shown in more detail and it can be seen that it has pits 410 and 412 of different sizes. In this particular example, the deepest pit which can be read introduces a $\pi$ phase shift into the path of the photons. The precision with which a phase can be determined defines the number of different depths that can be distinguished, and hence the amount of data stored per pit. Due to the enhanced resolution of the system, it is possible to sub-divide the depth into more levels than possible with a standard light source of the same wavelength (eight levels are shown here). The beam is reflected back by the bottom of the pit through lens 411 through quarter wave plate 409 which switches the beam back into a linearly polarised beam and this time it is reflected by polarising beamsplitter 407 due to the polarisation change caused by reflection. The radiation is reflected into polarising beamsplitter 417 where it is combined with radiation which has followed the second path.

In the second path, radiation which was reflected by first polarising beamsplitter 405 is directed via mirror 415 into polarising beamsplitter 417.

As previously described, the pit introduces a phase difference into the path of the photons which have followed path 1. If a zero phase different has been registered, then the photons from path 1 and path 2 will constructively interfere and the photon pair will be focused by lens 419 into the detection system. However, if photons following path 1 have a $\pi$ phase shift difference introduced into their path length, then the photons will destructively interfere and hence no photon will be detected by the detection system. When a $\pi/2$ phase change is introduced, there is 50% chance that destructive inference will be caused and a 50% chance that a bi-photon will be detected. Similarly, when a $3\pi/8$ phase change is introduced, there is a $\frac{3}{8}$ probability of constructive interference occurring and a $\frac{5}{8}$ probability of destructive inference occurring. Therefore, it is possible to determine the depth of the pit by measuring the count rate detected by the detection system.

The detection system of FIG. 13 comprises a detection system beamsplitter 421 which directs half the photons through filter 423 and into detector 425. The remaining photons are directed through filter 427 and into detector 429. Coincidence monitor 430 compares the results from detectors 429 and 425 and registers the presence of a bi-photon when both detectors 429 and 425 detect photons from the same pair.

FIG. 14 shows a variation on the system of FIG. 13. To avoid unnecessary repetition, like reference numerals will be used to denote like features. The system of FIG. 14 differs from that of FIG. 13 in the detection system. As for FIG. 13, path one and path two are combined using polarising beamsplitter 417 and the output of the polarising beamsplitter 417 is focused via lens 419 onto transmission grating 441.

Transmission grating 441 splits the bi-photon into two single photon beams. In general, the frequency of each photon in the pair is not equal. Thus, the grating separates the biphoton beam into two beams of different frequencies. For example, the first photon will always take the upper path 442 and be detected by detector 443 and the second photon will always take the lower path 444 and be detected by detector 445. Coincidence electronics 447 registers a bi-photon if a photon following the upper path and the lower path is detected. In this way, is a bi-photon is incident on the transmission grating, one photon will be directed to one detector and the other photon to the other detector as shown and coincidences occur with a maximum of unity probability. This is an improvement of the scheme of FIG. 13 where the probability of one obtaining one photon on each detector is 50%.

Alternatively, the detector in FIGS. 13 and 14 may be replaced with a single device that can distinguish the number of photons in the incident beam.

As described with reference to FIG. 3a, it is necessary to provide a triggering signal to the source. This is shown in FIG. 15a. FIGS. 15b and 15c show the gating signal for the two detectors of FIGS. 13 and 14. The detectors are only switched on for a fixed time which is sufficient for the photons that travel through the optical system and reach the detector. After this time, the detector is switched off again.

It is important to note that the concept of coincidence detection does not necessarily mean that photons arrive at the same time. For example, differences in distances travel or time emitted may exist between the first and second photon emitted in an entangled pair. Thus, each detector is optimized for the detection times of the individual photons. For example, detector 2 and FIG. 15 is gated on slightly later than detector 1. Small differences in the path compared to the bi-photon coincidence effect will not affect the interference.

The previous examples have all referred to encoding information on the data storage medium using the changing relief of the recording medium. However, FIG. 16 shows a birefringent reflection encoding medium. In FIG. 16, the refractive index of the data storage medium 501 is different for photons polarised in orthogonal directions. These directions can be plus or minus 45° to the tracks for example. Therefore, the path for photons with a polarisation of plus 45° to the track with lengths compared to that for those with a direction of minus a polariser of the direction of minus 45° to the track.

In the system of FIG. 16, an entangled photon source 503 emits polarisation entangled pairs with the state $(|AA\rangle + |DD\rangle)/\sqrt{2}$ where D and A represent diagonal and anti-diagonal polarised photons respectively.

The entangled light passes through filter 505 which removes any ambient light and then the radiation is passed through non-polarising beamsplitter 507 and is focused by lens 509 onto data storage medium 501. The birefringence of the disk applies a bit-dependent phase delay between the A and D polarised paths. The reflected beam is directed towards the detection system by the beamsplitter 507 and a focusing lens 509. The two photon lengths are then interfered by using linear polariser 511. Linear polariser is orientated to transmit vertically polarised photons. It should be noted that the photons at this point have a polarisation of either plus or minus 45°, so the polariser transmits the vertically polarised portions of the ±45° oriented waves. This results in constructive or destructive interference as previously explained. The biphoton beam then enters the biphoton detection system. The output from the linear polariser 511 is then outputted to beamsplitter 513. The output of the beamsplitter is then sent to either detector 515 or detector 517. Coincidence electronics 519 determines if there has been a coincidence reading between detector 515 and 517 which indicates the presence of a bi-photon.

It should be noted that a multi-photon detector can be replaced by other designs for example such as that of FIG. 14 which separates photon pairs by the use of a grating. Also, the means to interfere A and D polarised paths can be different. For example, rather than using a linear polariser and a multi-photon detector, a polarising beamsplitter and a pair of multi-photon detectors one for each output of the beamsplitter can be used. This configuration will increase the data rate by a factor of 2.

The invention claimed is:

1. An optical data retrieval system configured to retrieve data from a data storage medium, the system comprising:
a source of n path-entangled photons, where n is an integer of at least 2, the n path entangled-photons being in an entangled state, the entangled state being a superposition of at least a first state in which the n photons follow a first path through the system and a second state in which the n photons follow a second path through the system;
a detector system configured to determine if n photons have been received; and
an optical subsystem configured to direct photons from said source to said data storage medium and to said detector system.

2. An optical system according to claim 1, wherein said n photons are path entangled for m paths and m is an integer of at least 2.

3. An optical system according to claim 2, wherein each of said m paths are reflected off said recording medium.

4. An optical system according to claim 2, wherein one of said paths is configured to be reflected from said medium and another of said paths is configured to avoid said medium, the system further comprising means to interfere photons from the two paths.

5. An optical system according to claim 1, wherein said data storage medium is configured to vary the path length between photons with a first polarisation and photons with a second polarisation which have been reflected by said medium.

6. An optical system according to claim 1, wherein the photons are path entangled in a plane parallel to the direction in which the data is read.

7. An optical system according to claim 1, wherein the photons are path entangled in 3 or more paths and said 3 or more paths lie in 2 or more planes.

8. An optical system according to claim 1, wherein said source comprises a quantum dot.

9. An optical system according to claim 1, wherein said source comprises a waveguide structure configured to allow emission of photons with a first polarisation along a first path and photons with a second polarisation along a second path.

10. An optical system according to claim 1, where said source further comprises a polarising beam splitter configured to convert polarisation entangled photons to path entangled photons.

11. An optical system according to claim 1, wherein said detection system comprises a plurality of detectors and means to divide the entangled photons between said detectors, or between multiple detection regions of the same detector.

12. An optical system according to claim 1, wherein said detection system comprises at least one avalanche photodiode detector.

13. An optical system according to claim 12, wherein detection system further comprises a self-differencing circuit, said circuit comprising a signal divider to divide the output signal of the avalanche photodiode into a first part and a second part, where the first part is substantially identical to the second part, delay means for delaying the second part with respect to the first part and a combiner for combining the first and delayed second parts of the signal such that delayed second part is used to cancel periodic variations in the first part of the output signal.

14. An optical system according to claim 1, further comprising a plurality of sources of path entangled photons and a plurality of respective detectors.

15. An optical system according to claim 1, further comprising at least one tracking source and tracking detector, said tracking detector being configured to determine if the entangled photon source is positioned correctly from the intensity of the radiation detected from the tracking source.

16. An optical data retrieval method configured to retrieve data from a data storage medium, the system comprising:
outputting n path-mode-entangled photons, where n is an integer of at least 2, the n path entangled-photons being in an entangled state, the entangled state being a superposition of at least a first state in which the n photons follow a first path through the system and a second state in which the n photons follow a second path through the system;

directing photons from said source to said data storage medium and to a detector system; and detecting if n photons have been received.

17. An optical data retrieval system configured to retrieve data, the system comprising:

a data storage medium from which the data is retrieved, wherein said data storage medium comprises features which indicate data, said features having dimensions smaller than the diameter of a diffraction limited spot of the photons;

a source of n path-entangled photons, where n is an integer of at least 2, the n path entangled-photons being in an entangled state, the entangled state being a superposition of at least a first state in which the n photons follow a first path through the system and a second state in which the n photons follow a second path through the system;

a detector system configured to determine if n photons have been received; and an optical subsystem configured to direct photons from said source to said data storage medium and to said detector system.

18. An optical data retrieval system configured to retrieve data, the system comprising:

a data storage medium, from which the data is retrieved, said medium comprising a material whose properties are sensitive to absorption of n path-entangled photons where n is an integer of at least 2;

a source of n path-entangled photons, where n is an integer of at least 2, the n path entangled-photons being in an entangled state, the entangled state being a superposition of at least a first state in which the n photons follow a first path through the system and a second state in which the n photons follow a second path through the system;

a detector system configured to determine if n photons have been received; and an optical subsystem configured to direct photons from said source to said data storage medium and to said detector system.

19. A writable optical data storage system configured to store data on a writeable data storage medium, the system comprising:

means to convert data to be recorded into a pattern to be written onto the data storage medium;

a source of n path-mode-entangled photons, where n is an integer of at least 2, the n path entangled-photons being in an entangled state, the entangled state being a superposition of at least a first state in which the n photons follow a first path through the system and a second state in which the n photons follow a second path through the system; and an optical subsystem configured to direct said path entangled photons to impinge on said medium in accordance with said pattern.

20. A data storage method configured to store data on a writeable data storage medium, the method comprising:

converting data to be recorded into a pattern to be written onto the data storage medium;

irradiating said medium with a beam of n path-mode-entangled photons, where n is an integer of at least 2, the n path entangled-photons being in an entangled state, the entangled state being a superposition of at least a first state in which the n photons follow a first path and a second state in which the n photons follow a second path; and directing said path entangled photons to impinge on said medium in accordance with said pattern.

\* \* \* \* \*